UNITED STATES PATENT OFFICE.

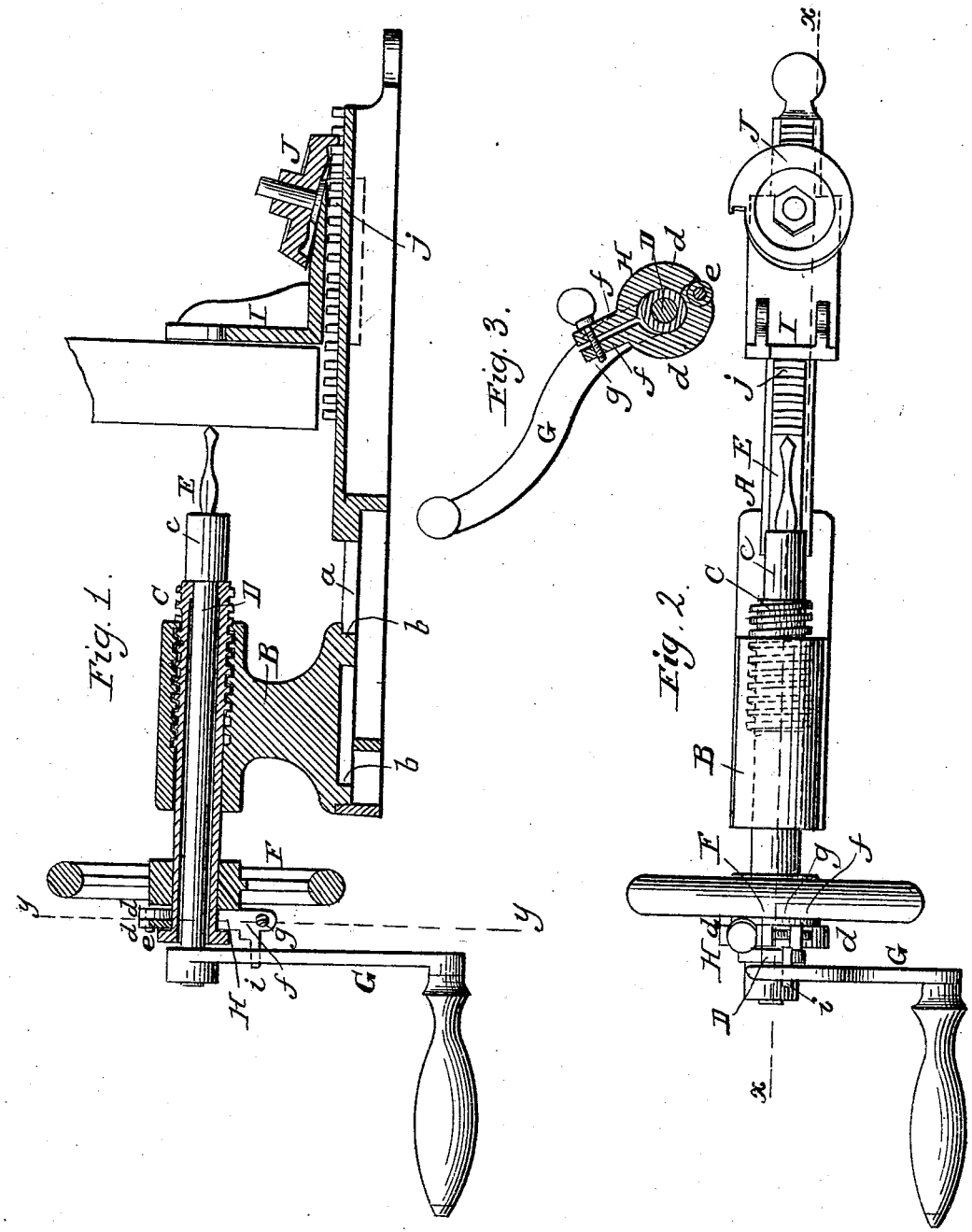

GEO. C. TAFT, OF WORCESTER, MASSACHUSETTS.

SELF-FEEDING DRILL.

Specification of Letters Patent No. 17,944, dated August 4, 1857.

*To all whom it may concern:*

Be it known that I, GEORGE C. TAFT, of Worcester, in the county of Worcester and State of Massachusetts, have invented a new and useful Improvement in Drilling-Machines for Drilling Metal; and I do hereby declare that the following is a full, clear, and exact description of the same, reference being had to the annexed drawings, making a part of this specification, in which—

Figure 1 is a longitudinal vertical section of my improvement; $(x)$, $(x)$, Fig. 2 indicating the plane of section. Fig. 2 is a plan or top view of ditto. Fig. 3 is a transverse section of the drill arbor, tube on which the screw is formed, and the clamp; $(y)$, $(y)$, Fig. 1 indicates the plane of section.

This invention relates to an improved feed motion for drilling machines wherein the drill is fed automatically to its work and with the proper speed at all times.

The invention consists in connecting the tube on which the screw is cut with the drill arbor or its crank, by means of a friction clamp arranged as will be hereinafter fully shown and described, whereby the result above stated is attained in the most simple and effectual manner.

To enable those skilled in the art to fully understand and construct my invention, I will proceed to describe it.

A represents what may be termed the bed of the implement. This bed is constructed of cast iron and one end is hollow or of shell form, and has a slot $(a)$ made through its upper surface to receive lugs $(b)$ of a head B. The lugs $(b)$ are of dove-tail form and the slot $(a)$ at certain points is enlarged to allow the lugs $(b)$ to pass through. The sides of the slot with the exception of the enlarged portions are inclined and when the lugs are fitted between them they screw the head to the bed.

The head B is constructed of cast iron, is of the usual form, and has a screw C fitted longitudinally in its upper part, this screw is hollow, and the drill arbor D is fitted within it, a shoulder $(c)$ being on one end of the arbor against which shoulder one end of the screw C bears.

E represents the drill which is fitted in one end of the arbor D, the end on which the shoulder $(c)$ is formed. On the end of the screw C, the end opposite to that which bears against the shoulder, a hand-wheel F is placed, and a crank G is placed on the end of the drill arbor D.

H represents a clamp which is formed of two semi-circular metal bars $(d)$ $(d)$ jointed together as shown at $(e)$. The opposite ends of these curved bars have each a radial projection $(f)$ the two projections being parallel with each other when in contact. Through these projections a thumb screw $(g)$ passes.

The clamp H is placed on the outer end of the screw C, and it may be fitted more or less tightly upon it by adjusting the screw $(g)$. One of the projections $(f)$ has a pin $(i)$ attached to it, and this pin passes into the crank G.

I represents a head against which the article to be drilled is placed. This head is allowed to slide on the bed so that it may be adjusted nearer to or farther from the drill and to effect this a rack $(j)$ is formed on the upper surface of the bed A into which rack a scroll cam J gears.

From the above description of parts it will be seen that when the article to be drilled, shown in red, is placed against the head I and the drill arbor D turned, the screw C in consequence of being connected by the clamp H to the crank G will feed the drill to its work and with the proper speed or just as fast as the drill cuts, for the instant the screw attempts to force the drill forward faster than it cuts, the resistance offered to the turning of the drill will cause the clamp to slip around on the screw C, consequently a perfect automatic feed motion is obtained. The pressure of the clamp on the screw C may be regulated as desired by adjusting the screw $(g)$.

I do not claim placing the drill arbor within the hollow screw, for that arrangement is commonly used for feeding the drill to its work, the screw being turned by hand; neither do I claim the means employed for adjusting the head I;—but,

Having thus described my invention, what I claim as new, and desire to secure by Letters-Patent, is:

Connecting the screw C with the crank G by means of the clamp H, substantially as and for the purpose set forth.

GEO. C. TAFT.

Witnesses:
CHARLES BRUNBLECOM,
W. A. WILLIAMS.